(12) United States Patent
Menonna

(10) Patent No.: US 10,961,875 B2
(45) Date of Patent: Mar. 30, 2021

(54) BEARING FRAME OR CYLINDER HEAD COVER OF AN INTERNAL COMBUSTION ENGINE

(71) Applicant: Mahle International GmbH, Stuttgart (DE)

(72) Inventor: Antonio Menonna, Ditzingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/388,841

(22) Filed: Apr. 18, 2019

(65) Prior Publication Data

US 2019/0323386 A1    Oct. 24, 2019

(30) Foreign Application Priority Data

Apr. 19, 2018 (DE) .................. 10 2018 205 982

(51) Int. Cl.
| | |
|---|---|
| F01L 1/047 | (2006.01) |
| F01L 1/46 | (2006.01) |
| F02F 7/00 | (2006.01) |
| F16C 17/04 | (2006.01) |
| F16C 17/26 | (2006.01) |

(52) U.S. Cl.
CPC ............ F01L 1/047 (2013.01); F01L 1/46 (2013.01); F02F 7/006 (2013.01); F16C 17/04 (2013.01); F16C 17/26 (2013.01); F01L 2001/0476 (2013.01); F16C 2360/18 (2013.01)

(58) Field of Classification Search
CPC ..... F01L 1/46; F01L 2001/0476; F01L 1/047; F01L 2103/00; F01L 2101/00; F16C 2360/18; F16C 17/26; F16C 17/04; F16C 35/02; F02F 7/006
See application file for complete search history.

(56) References Cited

U.S. PATENT DOCUMENTS

| | | |
|---|---|---|
| 8,833,320 B2 | 9/2014 | Flender et al. |
| 9,512,872 B2 | 12/2016 | Menonna et al. |

(Continued)

FOREIGN PATENT DOCUMENTS

| | | |
|---|---|---|
| DE | 103 31 089 A1 | 2/2005 |
| DE | 10 2007 014 544 A1 | 10/2008 |

(Continued)

OTHER PUBLICATIONS

English abstract for DE-103 31 089.

(Continued)

*Primary Examiner* — Patrick Hamo
*Assistant Examiner* — Wesley G Harris
(74) *Attorney, Agent, or Firm* — Fishman Stewart PLLC

(57) ABSTRACT

A bearing frame or a cylinder head cover for an internal combustion engine may include at least one camshaft mounted in tunnel bearings in at least two bearing openings arranged along a bearing channel and completely enclosing at least one of the camshaft and a radial bearing, and at least one axial shaft bearing ring arranged on the camshaft. The axial shaft bearing ring may have a ring groove which is open towards the bearing frame or towards the cylinder head cover. At least one engagement element may be arranged on the bearing frame or on the cylinder head cover, which engagement element may engage into the ring groove and forms an axial bearing for the camshaft.

4 Claims, 2 Drawing Sheets

(56) References Cited

U.S. PATENT DOCUMENTS

| | | | | |
|---|---|---|---|---|
| 2006/0157008 A1* | 7/2006 | Lechner | ................ | F01L 1/047 |
| | | | | 123/90.6 |
| 2008/0295796 A1* | 12/2008 | Dunsch | ................ | F01L 1/053 |
| | | | | 123/195 C |
| 2009/0165737 A1* | 7/2009 | Kreisig | ................ | F01L 1/047 |
| | | | | 123/90.6 |
| 2014/0299092 A1* | 10/2014 | Menonna | ............... | F16C 17/04 |
| | | | | 123/195 C |
| 2016/0348719 A1* | 12/2016 | Uneura | ................ | F16C 27/02 |

FOREIGN PATENT DOCUMENTS

| | | | |
|---|---|---|---|
| DE | 10 2009 031 455 A1 | 1/2011 | |
| DE | 102009049218 A1 | 4/2011 | |
| DE | 102013205129 A1 | 9/2014 | |
| EP | 1936131 A1 | 6/2008 | |
| GB | 2 378 484 A | 2/2003 | |
| GB | 2378484 A * | 2/2003 | ............... F01L 1/46 |
| JP | S60102521 U | 7/1985 | |
| JP | S62-56825 U | 4/1987 | |
| JP | H0524901 U | 4/1993 | |

OTHER PUBLICATIONS

English abstract for DE-10 2007 014 544.
English abstract for DE-10 2009 031 455.
European Search Report dated Aug. 12, 2019 for coperiding European Patent Application No. EP19167060.

* cited by examiner

A-A

BEARING FRAME OR CYLINDER HEAD COVER OF AN INTERNAL COMBUSTION ENGINE

CROSS-REFERENCE TO RELATED APPLICATION

This application claims priority to German Patent Application No. DE 10 2018 205 982.9, filed Apr. 19, 2018, which is hereby incorporated in its entirety.

TECHNICAL FIELD

The present invention relates to a bearing frame or a cylinder head cover of an internal combustion engine having at least one camshaft. Moreover, the invention relates to an internal combustion engine and to a method for mounting a camshaft of this type.

BACKGROUND

Camshafts are required for the actuation of inlet and outlet valves in internal combustion engines, the assembly and mounting of modern camshafts in an internal combustion engine becoming increasingly more difficult on account of the complexity of the said modern camshafts.

DE 103 31 089 A1 has disclosed a cylinder head cover of the generic type for an internal combustion engine having at least one camshaft which protrudes through at least one bearing bracket along a bearing channel for the camshaft in the cylinder head cover, the bearing bracket having an opening or bore which encloses the camshaft completely.

DE 10 2007 014 544 A1 has disclosed an internal combustion engine having at least one camshaft which has at least one stop element for the formation of an axial bearing, which stop element interacts with a bearing frame of the axial bearing for axial mounting. Here, the stop element is formed by a cam of the camshaft, and the bearing frame additionally has a clearance for the cam shape of the cam. As a result, axial mounting can be achieved via a cam.

DE 10 2009 031 455 A1 has disclosed a further internal combustion engine having a camshaft system with a first camshaft for controlling gas exchange valves of the internal combustion engine. Here, a gearwheel is arranged fixedly on the camshaft so as to rotate with it. In order for it then to be possible for an axial bearing system of the camshaft which is as simple as possible to be realised, a housing part of the internal combustion engine has a recess in the interior of the housing, in which recess the gearwheel is guided circumferentially at least in regions in such a way that the gearwheel interacts at least by way of end face regions of gearwheel end faces which lie opposite one another on one of the two sides with in each case one side wall region of in each case one side wall of the recess. The gearwheel therefore has two tasks, namely firstly as a drive element and secondly as an axial bearing for the camshaft.

DE 10 2009 049 218 A1 has disclosed a camshaft of an internal combustion engine having at least one single-piece thrust washer which is arranged and is additionally fixed captively between the drive element which is joined fixedly to the camshaft and a functional element which is likewise joined fixedly to the camshaft.

DE 10 2013 205 129 A1 has disclosed a bearing frame of the generic type or a cylinder head cover of the internal combustion engine having at least one camshaft which is mounted therein, the camshaft being mounted in tunnel bearings in at least two bearing openings which are arranged along a bearing channel and enclose the camshaft completely.

A common feature of all the above-described solutions for axial mounting of a camshaft in an internal combustion engine is that the complete camshaft is inserted into a split bearing, such as a bearing block or a split cylinder head. This does not function in the case of a camshaft which is assembled in a cylinder head cover or a bearing frame, with the result that, in this case, the axial bearing is usually realised by way of a ball bearing (cf. DE 103 31 089 A1). A ball bearing of this type requires a large amount of radial installation space in the cylinder head cover or the bearing frame, however, which impedes the advantage of a cylinder head cover, namely being of lightweight and compact construction. The conventional axial mounting by means of a plain bearing, for example by way of two collared cams being joined on two sliding faces in the housing, also often proves problematic, since there is little space available in the cylinder head cover for cams of this type. Above all, it proves problematic to hold the cam during the mounting, since as a rule only one of the two cams can be held in a manner which is supported satisfactorily on a planar face in the push-in direction of the shaft.

SUMMARY

The present invention is therefore concerned with the problem of specifying an improved embodiment for a bearing frame or a cylinder head cover of the generic type, which improved embodiment is distinguished, in particular, by way of improved axial mounting of the camshaft.

According to the invention, the said problem is solved by way of the subjects of the independent claims. Advantageous embodiments are the subject matter of the dependent claims.

The present invention is based on the general concept of mounting a camshaft in a bearing channel of a bearing frame or a cylinder head cover of an internal combustion engine, which bearing channel encloses the shaft completely, and of at the same time realising axial mounting of the camshaft exclusively on the said cylinder head cover or the bearing frame. According to the invention, to this end, the above-described bearing frame or the cylinder head cover has at least two bearing openings which are arranged along the bearing channel and in which the camshaft is mounted radially. Here, the said bearing openings enclose the camshaft and/or a radial bearing completely. In addition, at least one axial shaft bearing ring is arranged on the camshaft, which axial shaft bearing ring is however not configured as a conventional shaft ring, however, but rather has a ring groove which is open towards the bearing frame or towards the cylinder head cover. In turn, at least one engagement element, for example a pin or a blade, is arranged on the bearing frame or on the cylinder head cover, which at least one engagement element engages into the ring groove and makes axial mounting of the shaft possible as a result. As a result, an assembled camshaft can be mounted at the same time in the axial direction in a tunnel bearing system of a cylinder head cover or a bearing frame, without complicated ball bearings being necessary for this purpose, which ball bearings additionally require a large amount of radial installation space. Moreover, the axial bearing system with the engagement element which is arranged in the cylinder head cover or in the bearing frame and the axial shaft bearing ring which is arranged on the camshaft does not require any modifications at all in the case of the mounting of the assembled camshaft in the cylinder head cover or the bearing frame, since the axial shaft bearing ring is joined onto the camshaft via merely a further functional element, such as a cam. Moreover, it is particularly advantageous in the case of the axial bearing system according to the invention that this also requires a comparatively small amount of installation space in the axial direction of the camshaft, which proves to be a great advantage, in particular, in comparison with collared cams with sliding faces which have been used up to now. The comparatively simple mounting of the camshaft according to the invention in the bearing frame or in the cylinder head cover is of further great advantage, since the said camshaft has to merely be joined into the bearing channel in the usual way, it being possible for the engagement element, for example a pin, to also subsequently be introduced through a corresponding opening in the cylinder head cover or the bearing frame and to be brought into engagement with the ring groove of the axial shaft bearing ring. This also represents a substantial advantage with respect to DE 10 2013 205 129 A1, in the case of which a circular axial bearing plate was arranged on the camshaft, which circular axial bearing plate had to engage into a corresponding recess on the cylinder head cover or on the bearing frame.

In the case of one advantageous development of the solution according to the invention, the engagement element is configured as a pin or as a blade. In particular, the configuration of the engagement element as a pin makes simplified mounting possible, since (as has already been described above) the camshaft can merely be pushed in the usual way into the bearing channel and subsequently the pin can be plugged through a corresponding opening in the cylinder head cover or in the bearing frame and can be brought into engagement with the ring groove of the axial bearing shaft ring. The advantage of a blade in comparison with the pin lies, in particular, in the larger axial bearing surface area, as a result of which a higher axial bearing force can be achieved. Here, both the blade and the pin can be configured from a material with a low sliding friction resistance, as a result of which the axial bearing system can be configured in an optimized manner in terms of friction. If the engagement element is configured as a pin, a sleeve which receives the pin can additionally be arranged in the bearing frame or in the cylinder head cover, as a result of which creep-free and, as a result, reliable mounting of the pin and/or also the camshaft is possible even in the case of a configuration of the cylinder head cover or the bearing frame from plastic.

In one advantageous development of the solution according to the invention, the bearing frame or the cylinder head cover is configured from plastic, which affords the great advantage that they can be produced not only in an optimized manner in terms of weight, but rather also with high quality and at the same time inexpensively. As an alternative, it goes without saying that it is also conceivable that the bearing frame or the cylinder head cover is configured from metal, for example from aluminium. A comparatively weight-optimized configuration is also still possible as a result, but with considerably increased rigidities in comparison with plastic. It goes without saying that it is also conceivable that the bearing frame is configured from metal, for example from aluminium, and receives the engagement element for axially mounting the camshaft, whereas a cylinder head cover which covers the bearing frame has merely a covering function and, as a result, can be configured from light and inexpensive plastic.

In the case of a further advantageous embodiment of the solution according to the invention, the engagement element has an oil channel, via which oil can be fed into the ring groove of the axial shaft bearing ring through the bearing frame or the cylinder head cover and the respective engagement element. In this case, for example, the engagement element can be configured as a sleeve. In the case of a configuration of this type of the engagement element as a sleeve, an increased functionality can be achieved by way of this, since a sleeve of this type assumes not only an axial bearing function, but rather at the same time also a lubricating function. A smooth axial bearing system of the camshaft can be achieved and, as a result, a friction resistance can be lowered via lubrication of this type of the axial bearing.

An oil feed for lubricating the axial shaft bearing ring expediently takes place via the camshaft, an oil channel in the camshaft having a greater diameter than an oil channel in the axial shaft bearing ring. As a result, in particular, any joining faults during joining, in particular during thermal joining, of the axial shaft bearing ring on the camshaft can be compensated for. Here, the oil channel in the axial shaft bearing ring is connected in a communicating manner to the oil channel in the camshaft and makes lubrication of the circumferential/ring groove which is open to the outside possible, as a result of which a particularly smooth axial bearing system can be achieved. An oil channel which is usually present in the camshaft in any case and is used, for example, for lubricating a valve train can be used additionally for lubricating the axial bearing as a result of the lubrication of the axial bearing via the camshaft. To this end, merely a radial bore is to be guided through between the ring groove of the axial shaft bearing ring and the usually centrally arranged oil channel in the camshaft.

In the case of one advantageous development of the solution according to the invention, the camshaft is mounted in the radial direction via at least one additional plain bearing. To this end, a plain bearing ring can be positioned directly on the camshaft, for example by means of a thermal joining method, which plain bearing ring assumes the radial bearing function in a corresponding bearing socket of the bearing frame or of the cylinder head cover. Here, in particular, the use of a coating which reduces the friction resistance on the plain bearing ring or a configuration of the latter from a material with a low coefficient of sliding friction is conceivable. The radial bearing system can also be of relatively smooth design here, by, for example, a lubrication of the radial bearing taking place via an oil channel in the camshaft or via an oil channel in the bearing frame or in the cylinder head cover.

Furthermore, the present invention is based on the general concept of equipping an internal combustion engine with a bearing frame of this type or a cylinder head cover of this type and, as a result, of transferring the above-described advantages in relation to the bearing frame or the cylinder head cover to the internal combustion engine.

Furthermore, the present invention is based on the general concept of specifying a method for mounting an assembled camshaft in a bearing frame or a cylinder head cover, in the case of which method the bearing frame or the cylinder head cover is held by means of a holding apparatus, and in the case of which method functional elements which are to be mounted and the axial shaft bearing ring are gripped by means of a gripping device and are arranged and fixed with their through-openings coaxially with respect to bearing openings of the bearing frame or the cylinder head cover which are arranged along a bearing channel. Subsequently, the shaft, which is, for example, cooled, is pushed through the bearing openings of the bearing frame or the cylinder head cover and the through-openings, which are, for example, heated, of the functional elements and the axial shaft bearing ring, the axial shaft bearing ring having a ring groove which is open towards the bearing frame or towards the cylinder head cover, and is positioned on the camshaft in such a way that the ring groove is aligned substantially in the radial direction with an opening on the bearing frame or on the cylinder head cover. As a result, a thermal joint of the functional components and the axial shaft bearing ring on the camshaft can be achieved after thermal equilibrium. It goes without saying that a press fit is also conceivable as an alternative. At least one engagement element is then pushed into the ring groove through the opening on the bearing frame or on the cylinder head cover, and an axial bearing for the camshaft is therefore formed. It is advantageous in the case of the method according to the invention that the additional axial shaft bearing ring outside the bearing openings and the subsequent mounting of the engaging element open up the possibility of joining the camshaft with an axial offset to the bearing frame or to the cylinder head cover, as a result of which additional space can be obtained which is available for the gripping device (component supports, joining grippers).

A pin or a blade can be used as engagement element. In addition, a sleeve which receives the engagement element can be arranged in the opening before the said engagement element. An oil channel for lubricating the axial bearing can also be formed by means of a sleeve.

Further important features and advantages of the invention result from the subclaims, from the drawings and from the associated description of the figures using the drawings.

It goes without saying that the features which are mentioned in the above text and are still to be described in the following text can be used not only in the respective specified combination, but rather also in different combinations or on their own, without departing from the scope of the present invention.

BRIEF DESCRIPTION OF THE DRAWINGS

Preferred exemplary embodiments of the invention are shown in the drawings and will be described in greater detail in the following description, identical reference numerals relating to identical or similar or functionally identical components.

In the drawings, in each case diagrammatically.

DETAILED DESCRIPTION

Figure 1:
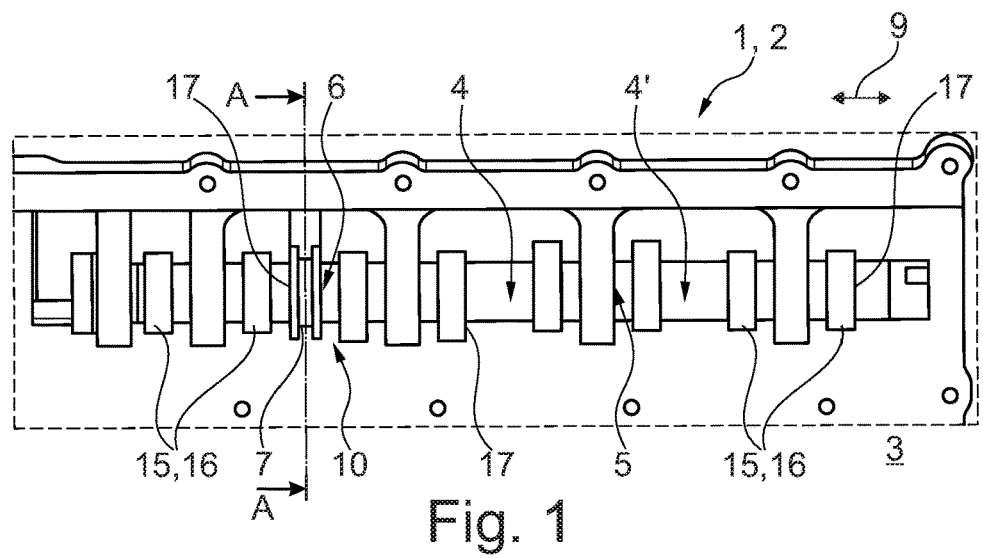
FIG. 1 shows a view from below of a cylinder head cover according to the invention or a bearing frame according to the invention.
Figure 2:
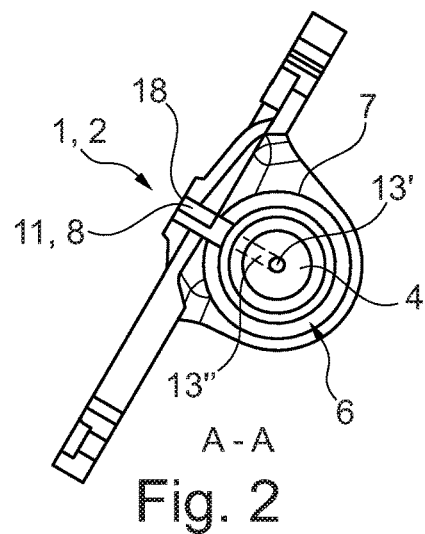
FIG. 2 shows a sectional illustration along the sectional plane A-A from FIG. 1.
Figure 3:
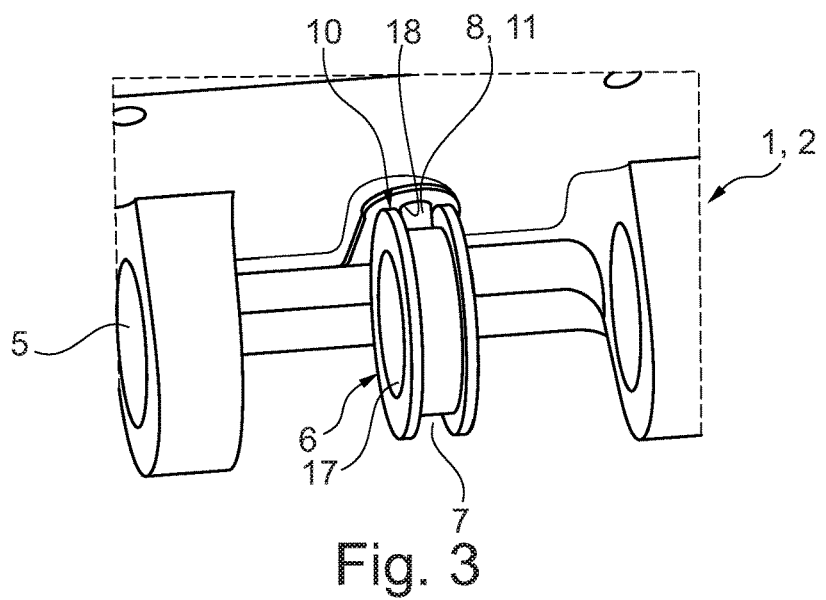
FIG. 3 shows a detailed illustration of an engagement element which engages into the axial shaft bearing ring.
Figure 4:
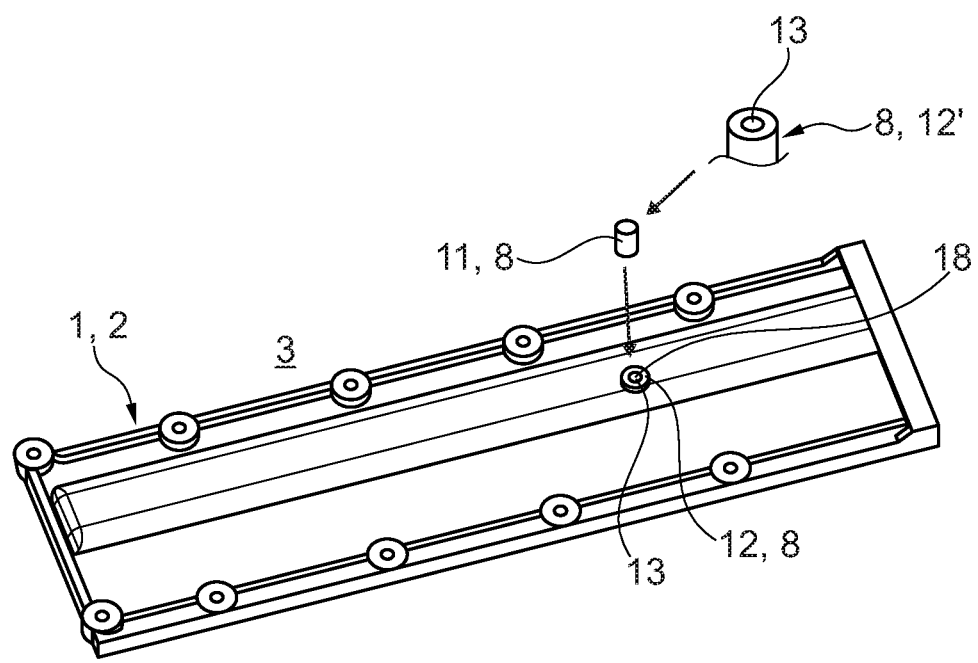
FIG. 4 shows an illustration of the bearing frame or the cylinder head cover from above.
Figure 5:
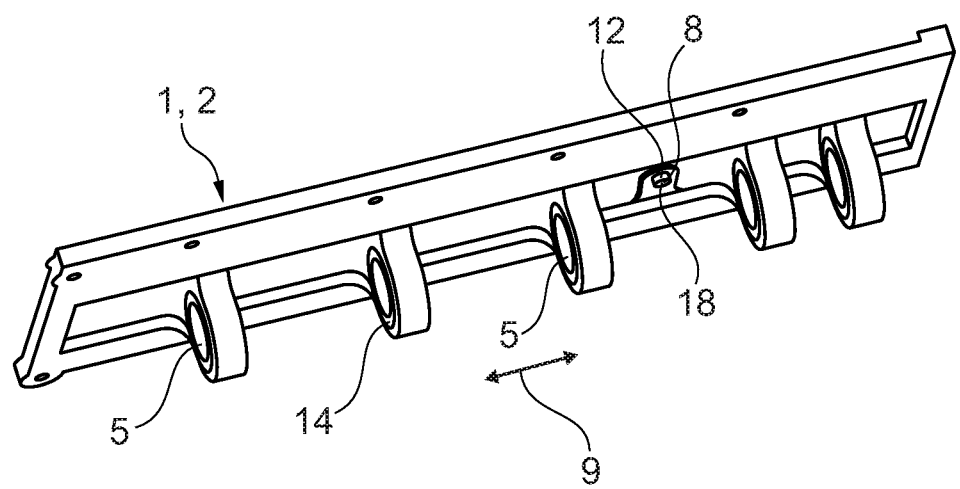
FIG. 5 shows an illustration as in FIG. 4, but obliquely from below.

In accordance with FIGS. 1 to 5, a bearing frame 1 according to the invention or a cylinder head cover 2 according to the invention of an internal combustion engine 3 has at least one camshaft 4 which is mounted therein (cf. FIGS. 1 and 2), the camshaft 4 being mounted in tunnel bearings in at least two bearing openings 5 which are arranged along a bearing channel. Here, the bearing openings 5 enclose the camshaft 4 completely. According to the invention, at least one axial shaft bearing ring 6 (cf., in particular, FIGS. 2 and 3) is then arranged on the camshaft 4, which axial shaft bearing ring 6 has a ring groove 7 which is open towards the bearing frame 1 or towards the cylinder head cover 2. At least one associated engagement element 8 is arranged on the bearing frame 1 or on the cylinder head cover 2, which engagement element 8 engages into the ring groove 7 and, as a result, forms an axial bearing 10 for the camshaft 4. By way of the axial bearing system according to the invention of the camshaft 4, the latter can be mounted not only reliably in the axial direction 9, but rather also mounting of an axial bearing 10 of this type is possible in a comparatively simple manner, since the camshaft 4 can first of all be moved in a usual way through the bearing openings 5 of the bearing frame 1 or the cylinder head cover 2, until the ring groove 7 of the axial shaft bearing ring 6 is oriented flush in the radial direction with respect to the engagement element 8. Subsequently, the engagement element 8 can be plugged through the bearing frame 1 or the cylinder head cover 2 into the ring groove 7, and the axial bearing 10 can be mounted as a result.

The engagement element 8 can be configured, for example, as a pin 11 or as a blade. In particular, the configuration of the engagement element 8 as a pin 11 affords the great advantage that a sleeve 12 which receives the pin 11 can additionally be arranged in the bearing frame 1 or in the cylinder head cover 2, which sleeve 12 reliably guides and fixes the pin 11. A sleeve 12 of this type can be appropriate in the case of a bearing frame 1 or a cylinder head cover 2 made from plastic, since creep deformations which possibly occur can be minimized as a result. If the bearing frame 1 or the cylinder head 2 is configured from metal, for example from aluminium, a sleeve 12 of this type can also be dispensed with. Here, the configuration of the bearing frame 1 or the cylinder head cover 2 from plastic affords the great advantage that they can be configured to be not only light and therefore optimized in terms of weight, but rather also to be high quality and inexpensive. In the case of a configuration of the bearing frame 1 or the cylinder head cover 2 from aluminium, a weight-optimized overall design can likewise be achieved and, in addition, the sleeve 12 can be dispensed with, for example, since the cylinder head cover 2 which is configured from metal or the bearing frame 1 which is configured from metal provides sufficient support to the engagement element 8.

In the case of a further advantageous embodiment of the solution according to the invention, the engagement element 8 can have an oil channel 13, via which oil can be fed through the bearing frame 1 or the cylinder head cover 2 to the axial bearing 10. In this case, it is conceivable, for example, that the engagement element 8 is configured as a sleeve 12', as indicated in accordance with FIG. 4. In addition or as an alternative, it goes without saying that it is also conceivable that a lubrication of the ring groove 7 of the axial shaft bearing ring 6 takes place via the camshaft 4, an oil channel 13' (cf. FIG. 2) running in the camshaft 4 to this end, and an oil channel 13" which is arranged radially with respect thereto running in the camshaft 4 and in the axial shaft bearing ring 6. Here, the two embodiments of the oil lubrication of the axial bearing 10 make a friction reduction and, as a result, a particularly smooth bearing system possible.

In the radial direction, the camshaft 4 can be mounted via at least one additional plain bearing 14, the radial mounting usually taking place in the bearing openings 5. The engagement element 8 and/or the axial shaft bearing ring 6 can be configured, for example, from a material which reduces the friction, or else can have a coating which reduces the friction, in order to assist a bearing system which is as smooth as possible.

In general, an axial bearing system of the camshaft 4 which is simple to mount and is at the same time effective can be achieved by way of the bearing frame 1 according to the invention or the cylinder head cover 2 according to the invention, without axial bearing plates, in particular thrust washers, which have been necessary up to now being necessary.

The present invention additionally relates to a method for mounting an assembled camshaft 4' in a bearing frame 1 or a cylinder head cover 2 in accordance with the preceding paragraphs, in the case of which method the bearing frame 1 or the cylinder head cover 2 is held by means of a holding apparatus (not shown), and functional elements 15 which are to be mounted, such as cams 16, and the axial shaft bearing ring 6 are gripped by means of a gripping device (likewise not shown) and are arranged with their through-openings 17 coaxially with respect to bearing openings 5 of the bearing frame 1 or the cylinder head cover 2 which are arranged along a bearing channel. The camshaft 4 is subsequently pushed through the bearing openings 5 of the bearing frame 1 or the cylinder head cover 2 and the through-openings 17 of the functional elements 15 and the axial shaft bearing ring 6, the axial shaft bearing ring 6 having a ring groove 7 which is open towards the bearing frame 1 or towards the cylinder head cover 2, and being positioned on the camshaft 4 in such a way that the ring groove 7 is aligned substantially in the radial direction with an opening 18 on the bearing frame 1 or on the cylinder head cover 2. At least one engagement element 8 is then pushed into the ring groove 7 through the opening 18 on the bearing frame 1 or on the cylinder head cover 2, and therefore forms an axial bearing 10 for the camshaft 4.

In general, a pin 11 or a blade can be used as engagement element 8. In addition, a sleeve 12 which receives the engagement element 8 can be arranged in the opening 18 before the said engagement element 8. An oil channel 13 for lubricating the axial bearing 10 can also be formed by means of a sleeve 12'. After the joining of the functional elements 15 and the axial shaft bearing ring 6, the assembled camshaft 4' is oriented in the axial direction thereof in such a way that the ring groove 7 is aligned in the radial direction with the opening 18 on the bearing frame 1 or on the cylinder head cover 2.

It is advantageous in the case of the method according to the invention that the additional axial shaft bearing ring 6 outside the bearing openings 5 and the subsequent mounting of the engagement element 8, for example the pin 11 or the blade, open up the possibility of joining the camshaft 4 with an axial offset to the bearing frame 1 or to the cylinder head cover 2. As a result, additional space can be obtained which can be utilized for the gripping device (component supports, joining grippers), in order for it to be possible for the said gripping device to be of more robust configuration.

The invention claimed is:

1. A method for mounting an installed camshaft in a bearing frame or a cylinder head cover, comprising:
   holding the bearing frame or a cylinder head cover via a holding apparatus;
   gripping functional elements to be mounted and an axial shaft bearing ring via a gripper;
   arranging the functional elements with their through-openings coaxially with respect to bearing openings of the bearing frame or the cylinder head cover, which are arranged along a bearing channel;
   pushing the camshaft through the bearing openings and the through-openings of the functional elements and the axial shaft bearing ring;
   positioning an axial shaft bearing ring having a ring groove, which is open towards the bearing frame or towards the cylinder head cover, on the camshaft in such a way that the ring groove is aligned substantially in a radial direction with an opening on the bearing frame or on the cylinder head cover;
   arranging a sleeve in the opening on the bearing frame or on the cylinder head cover;
   receiving at least one engagement element in the sleeve;
   pushing the at least one engagement element into the ring groove of the axial shaft bearing ring on the camshaft.

2. The method according to claim 1, wherein the engagement element is a pin or a blade.

3. The method according to claim 1, wherein the engagement element is a sleeve, which forms an oil channel.

4. The method according to claim 1, wherein positioning the axial shaft bearing ring further includes orienting the camshaft in an axial direction orienting the camshaft in an axial direction of the camshaft in such a way that the ring groove is aligned in the radial direction with the opening on the bearing frame or on the cylinder head cover.

\* \* \* \* \*